US008243098B2

(12) United States Patent
Benito et al.

(10) Patent No.: US 8,243,098 B2
(45) Date of Patent: Aug. 14, 2012

(54) AUTHORITATIVE DISPLAY FOR CRITICAL SYSTEMS

(75) Inventors: Robert Patrick Benito, Tampa, FL (US); Brian Michael Shade, Belle Mead, NJ (US); Stephen Kwokwai Lau, Marlboro, NJ (US); George Vinansky, Jr., Tannersville, PA (US); Justin Matthew Gray, Colorado Springs, CO (US); Satish Dattatraya Paranjpe, Kendall Park, NJ (US); Marshall Wayne Huss, Riverview, FL (US); Michael Dane Bonastia, Morristown, NJ (US)

(73) Assignee: Mitre Corporation, McLean, VA (US)

( * ) Notice: Subject to any disclaimer, the term of this patent is extended or adjusted under 35 U.S.C. 154(b) by 729 days.

(21) Appl. No.: 12/485,494

(22) Filed: Jun. 16, 2009

(65) Prior Publication Data

US 2010/0315434 A1    Dec. 16, 2010

(51) Int. Cl.
*G09G 5/00* (2006.01)
(52) U.S. Cl. ....................................................... 345/629
(58) Field of Classification Search ........................ None
See application file for complete search history.

(56) References Cited

U.S. PATENT DOCUMENTS

| | | | | |
|---|---|---|---|---|
| 4,716,404 A | * | 12/1987 | Tabata et al. | 345/625 |
| 6,330,001 B1 | * | 12/2001 | Nakao | 345/629 |
| 6,348,923 B2 | * | 2/2002 | Murata | 345/629 |
| 6,433,783 B2 | * | 8/2002 | Murata | 345/440 |
| 7,050,070 B2 | * | 5/2006 | Ida et al. | 345/629 |
| 2002/0005859 A1 | * | 1/2002 | Murata | 345/629 |
| 2003/0193512 A1 | * | 10/2003 | Komagata | 345/629 |
| 2008/0175377 A1 | * | 7/2008 | Merrill | 380/30 |
| 2009/0201315 A1 | * | 8/2009 | Nishida | 345/634 |
| 2009/0278858 A1 | * | 11/2009 | Shigeeda | 345/629 |
| 2010/0079492 A1 | * | 4/2010 | Nakamura | 345/634 |

\* cited by examiner

*Primary Examiner* — Ryan R Yang
(74) *Attorney, Agent, or Firm* — Proskauer Rose LLP (57) ABSTRACT

A system and method of rendering an authoritative image on a graphical display that is part of a critical system wherein image data is received from a source and the image data is stored in a storage module. The plurality of partial images are then generated from a subset of the image data, the partial images can include an indicator. The plurality of images are then combined to form the image, and the image is presented in a single graphical display. The image can then be evaluated by an operator for validity and correctness.

25 Claims, 8 Drawing Sheets

AUTHORITATIVE DISPLAY FOR CRITICAL SYSTEMS

GOVERNMENT RIGHTS

This invention was made with government support under contract no. W15P7T-08-C-F600/A120 awarded by the United States Army for project no. 0708A12CNM. The government may have certain rights in the invention.

FIELD OF THE INVENTION

The present invention relates generally to a method of rendering an image on a graphical display.

BACKGROUND OF THE INVENTION

A critical system is a system whose failure or malfunction may result in death or serious injury to people, loss or severe damage to equipment or environmental harm. Many critical systems rely on correct, valid images being displayed on graphical displays, allowing users of the system to make decisions or execute operations based on the displayed image. The operator of the critical system has to be assured, however, that the image that is displayed is a correct, valid image, since incorrect, yet valid images can not be detected by the operator or user. An example of a critical system design that allows an evaluator to be confident of the displayed image is the dual display images will be presented in air craft control systems. These dual displays, however, require that the operator constantly scan two different display screens and detect any differences or changes between the two different displays.

A valid, incorrect images are images that appear to be correct to the operator, or evaluator of the image, but through an inadvertent or malicious event the image data is corrupted, resulting in the presentation of an image that could appear to be correct, that is complies with all the display formalities, yet the image conveys information that is incorrect.

Figure 1:
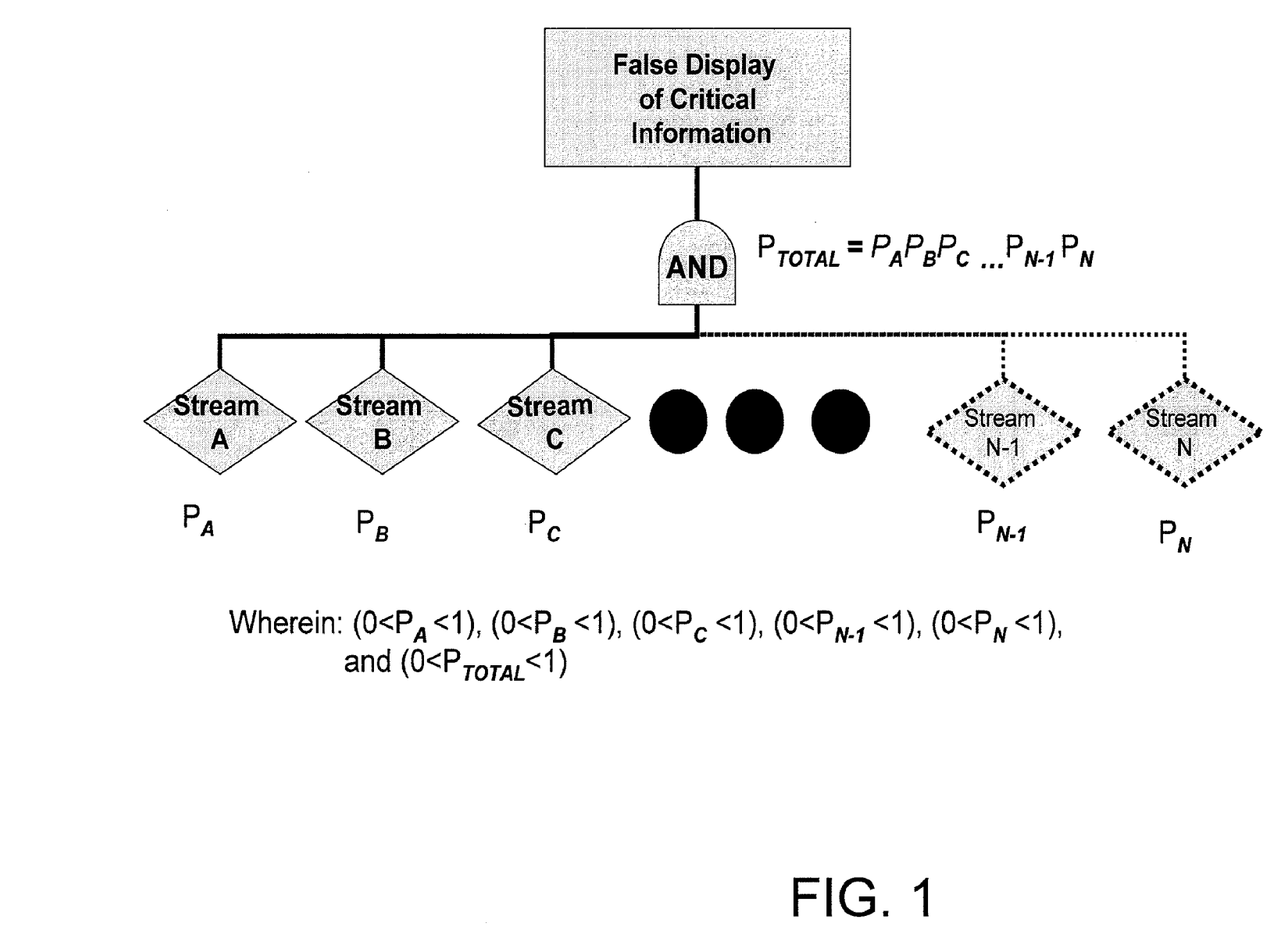
FIG. 1 shows an illustration of a fault tree analysis that is used to determine the fault tolerance threshold for a critical system.

To determine the likelihood that an incorrect, valid image will be displayed, a fault tree analysis can be conducted. A fault tree analysis is a failure analysis in which an undesired state of the system is analyzed using boolean logic to combine a series of lower-level events. This analysis method is mainly used to quantitatively determine the probability of a failure event. In a critical system fault tree analysis, like that shown in FIG. 1, any failure (shown as Stream A-N) would generate a false display of the critical information in the display. By calculating the probability of the occurrence of any fault event and then multiplying the probability of the occurrence of each fault event, a system designer can generate an overall likelihood of a false display of critical information, e.g., displaying an incorrect, valid image. Critical systems must be designed such that the probability of displaying an incorrect, valid image is minimized because any incorrect, valid image could have catastrophic results for the operator or others relying on the information contained in the displayed image. AS a result, every system when designed is allocated a fault tolerance threshold which is the maximum allowable probability that an incorrect, valid image is displayed by the critical system.

An additional problem associated with designing reliable, critical systems is that the reliability of hardware and software components used in critical systems directly relates to the respective cost of the component. Therefore, the most expensive components are also the most reliable. Therefore, if a system design requires extremely reliable operations, then the cost of the components is generally commensurately higher then the components costs of a less reliable system.

SUMMARY OF THE INVENTION

In one aspect of the present invention, the invention features a system for rendering an image on a graphic display. In one embodiment, the system includes means for receiving image data from a source, means for generating a partial image from a subset of the image data, means for combining multiple partial images to form the image, and means for presenting the image in a single graphical display that can be evaluated by an operator.

In another aspect, the present invention includes a method of rendering an image on a graphic display. According to one embodiment of the invention, the method includes receiving image data from a source, storing the image data in a storage module, generating a plurality of partial images, each partial image derived from a subset of the image data, combining the plurality of partial images to form the image, and presenting the image in a single graphical display.

In a further aspect of the invention, the invention features a method of rendering an authoritative graphic display for a critical system. The method, in one embodiment can include receiving image data from a source, storing the image data in a storage module, generating multiple partial images that include an indicator, the partial images derived from a subset of the image data, combining the multiple partial image to form an image, and presenting the image in a single graphical display that can be evaluated by an operator.

Any of the aspects above can include one or more of the following features. A digital signature can be passed with the image data and the plurality of partial images to allow for authentication of the sender. The image data can be received from the source in communication with the graphical display via a network. The image data received from the source can be copied, and an original image can be generated from the copy of the image data. The original image can be compared to the image generated by combining by the plurality of partial images. In some embodiments the image can be presented in a single graphical display such that an operator can determine the validity of the image.

The aspects above can also include any of the following features. Metadata can be associated with each partial image. In some embodiments, each partial image comprises the metadata. The metadata can include properties of the partial image including color, shape, or location. In some embodiments, a first portion of the metadata is common to all the partial images that form an image. A second portion of the metadata can be unique to each partial image. The validity of the image can be determined by combining the first portion of the metadata from multiple partial images. And in some embodiments, the validity of the image can be determined by evaluating an indicator that is part of each partial image after combining the plurality of partial images to form the image.

The aspects above can also include receiving image data from a sensor and authenticating the sensor. And in some embodiments the image data can be transmitted over a data stream.

Any of the aspects can also include one or more of the following features. In some embodiments, the source is a secure source, and in some embodiments the image data is encrypted. The invention can also include decrypting encrypted image data. A fault tolerance threshold for the software and hardware that generates and transmits the partial image can be less than the fault tolerance threshold of the software and hardware necessary to display an authoritative image. The fault tolerance threshold for the image can be selected based on the number of faults that would produce an incorrect and valid image.

The aspects can further include any of the following features. The system can include means for comparing the image generated by the more than one partial image with an original image generated from the image data. Some embodiments can feature means for storing the data in a storage module. And some embodiments can include means for decrypting image data that is encrypted.

DETAILED DESCRIPTION OF THE INVENTION

In the present invention, through the use of multiple commands to the critical display via the graphics processor and/or display drivers, a critical image displayed to the user can be generated and evaluated with confidence it has not been altered inadvertently or maliciously. The multiple commands are used to render an image and eliminate the risk of a single failure producing an incorrect, yet valid, critical image. This invention requires multiple failures for an incorrect, yet valid image to be rendered to the user thus making it an authoritative display. For an incorrect, yet valid, image to be rendered to the user using this process, multiple failures would be required.

As used herein, "critical system" means is a system whose failure or malfunction may result in death or serious injury to people, loss or severe damage to equipment or environmental harm. In some embodiments a critical system is also referred to as a life-critical system or safety-critical system. However, a critical system can also be used to mean other systems that are not always categorized as a life-critical system or safety-critical system. In some embodiments, the critical system can include networks, sensors, actuators, computers, and displays. In some embodiments, the critical system would also be considered to include the human operator or evaluator. Critical system can be designed such that the reliability of the system is part of the engineering design to prevent or lower the probability that a failure will occur. Depending on the criticality of the system, i.e., the gravity of the outcome if a failure occurs and is not detected, the reliability of the system can be adjusted based on the software and hardware selected as part of the design process. A critical system can also be made more reliable by increasing the number of faults that produce an incorrect, yet valid, image, see e.g., FIG. 1 "Fault Tree of False Display of Critical Information." In one embodiment, the system can be optimized to include sufficient resources (which can be either hardware, or software, or both) to satisfy the reliability requirements of the critical system.

As used herein, "an image" consists of anything that is rendered on a display of the critical system. In addition, a "critical image" means images being displayed on graphical displays, allowing users of the system to make decisions or execute operations based on the image displayed.

Figure 2:
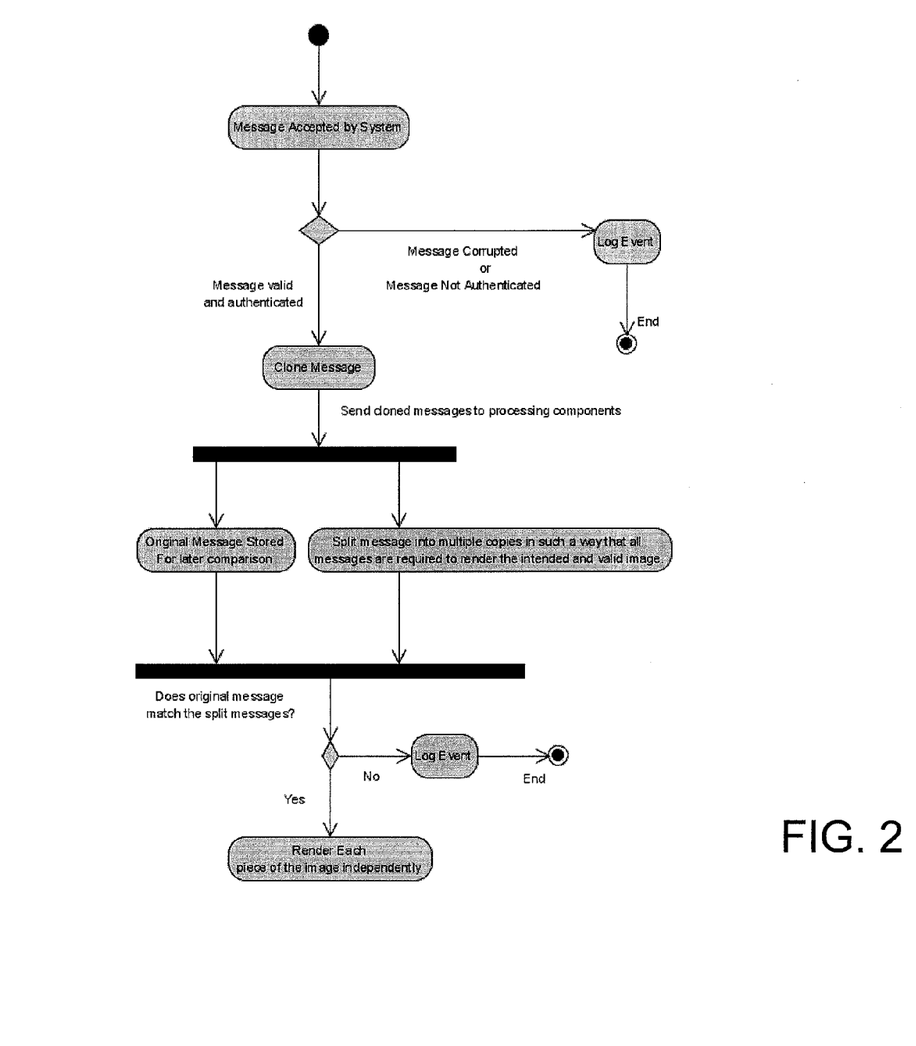
FIG. 2 shows a exemplary embodiment of the present invention.

In FIG. 2 the invention includes a method of displaying a critical image. A message is received 20 by the system. In some embodiments. the message comprises image data or other critical information that is used to generate a critical image. The message can be transmitted in packet format, or as a binary data packed into an IP packet, and in some embodiments it can be the XML in a SOAP message. The information or messages transmitted from the originating source can also be independent of the critical system implementation. The message can be received through a wired, wireless, or neural networks that are in communication with the critical system. Other types of networks include point-to-point communication, point-to-multipoint communication, broadcasting, cellular networks and other wireless networks. In some embodiments the wired networks can include circuit switched, packet switched, or packet based networks. Other types of wireless communication can be via radio frequency communication, microwave communication, for example long-range line-of-sight via highly directional antennas, or short-range communication, or infrared (IR) short-range communication, for example from remote controls or via IRDA.

The message is received by the critical system from a data source which can be an external sensor or internal sensor. The messages can also be received from data sources that include data stores, computational outputs, and external information streams. In some embodiments the critical system is not capable of determining the reliability of the sensor or the network in communication. When the message is received by the critical system, it is evaluated for data corruptions. And in some embodiments, the digital signature of the sender is examined or verified. The message can also be encrypted with a private key that only the sender and receiver have—this would also help to verify the sender. Biometrics can also be implemented as a method of evaluating the message. If the message is corrupted, or the sender is not able to be authenticated, the event is logged 22. If the system determines that the message is valid and the sender or message is authenticated, as necessary, then the message is processed by the system. In processing the message, the system can clone the message 23. In some embodiments, cloning the message comprises generating a copy of the original message. The original message can be stored 24, for example, in a storage module. The system can then generate partial image from a subset of the copied message data.

Figure 3:
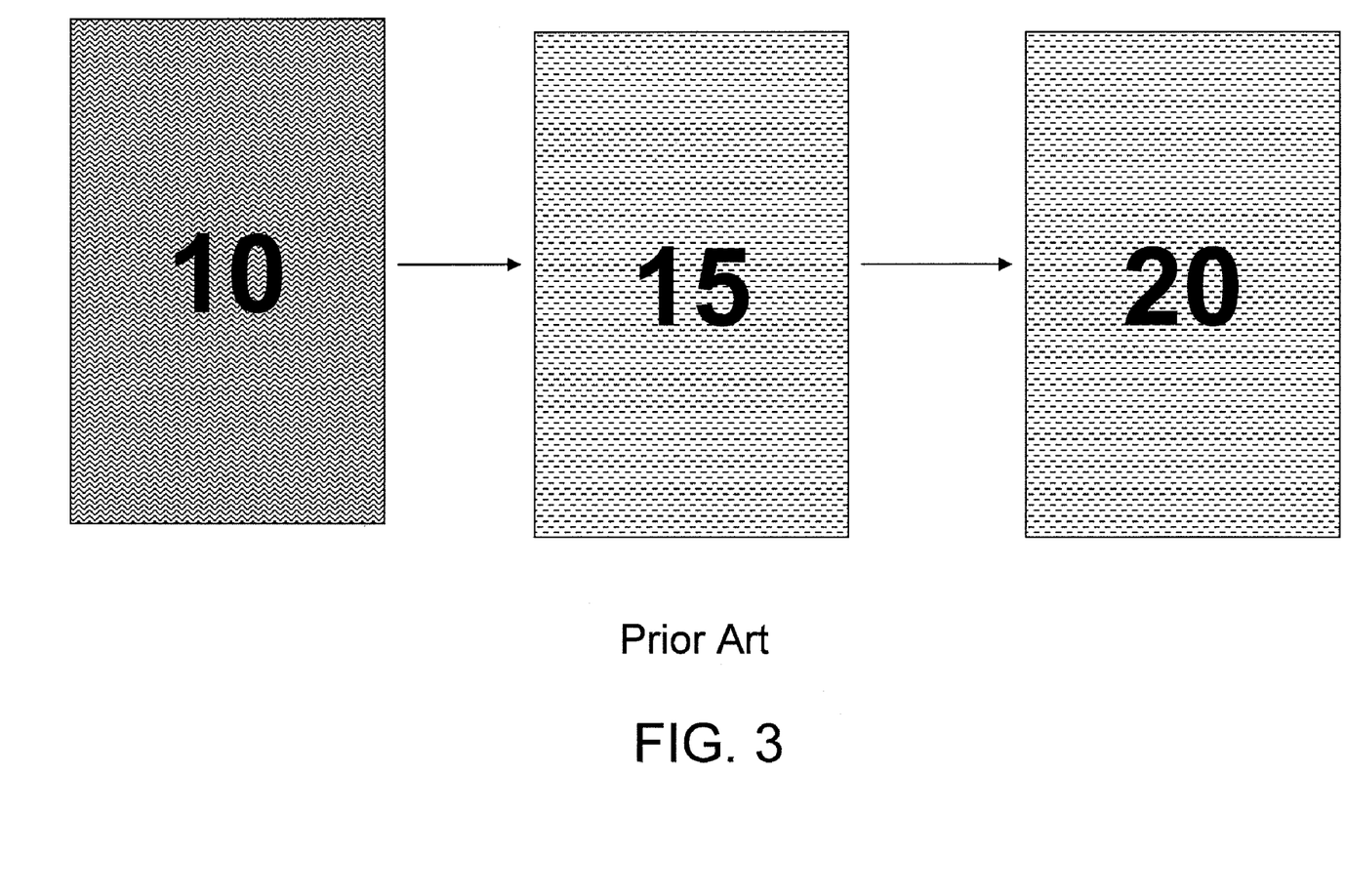
FIG. 3 shows a prior art illustration of a data transmission that would provide a valid, but incorrect graphical image.

FIG. 3 shows a prior art embodiment used to generate the display of a critical image. The received message 10 is shown having image data. In some embodiments the message is received from a sensor which can measure seismic, imagery, or acoustic values. In some embodiments the sensor can provide a reading of critical information off a body. And in some embodiments the message is received from a transmitting module that transmits information or data to the critical system after a request from the critical system. Alternatively, the transmitting module can periodically transmit a signal that is then received or detected by the critical system. As the message 15 is transmitted through the system, a fault event occurs which corrupts or changes at least a portion of the image data that defines the critical image. For example, in FIG. 3, the shading of the image is corrupted. In some embodiments, the image data associated with the color or shape of the critical image may be corrupted. Therefore, when the image is displayed 20, an incorrect, valid image is displayed to the user or operator. As shown, the operator viewing the image displayed 20 has no way to determine that the displayed image 20 is incorrect. In FIG. 3, a single point of failure transformed a correct image into an incorrect, valid image.

The present invention ensures that the operator can determine by examining the displayed image whether the image is a correct or incorrect image. This is because the present invention causes incorrect images to display as invalid images. As a result, images displayed by critical systems that utilize partial images transmitted across independent commands can be considered "authoritative displays." This is in contrast to the prior art where an incorrect image would be displayed as a valid image. A invalid image is determined because there is an inconsistency or notable defect in the displayed image that can be recognized and evaluated by the operator of a critical system. Therefore, when the operator views an incorrect, invalid image generated by a critical system utilizing the present invention, the operator is able to detect and disregard the information presented by the image.

The critical system utilizing the present invention can include a desktop or personal computer. The critical system can also include a proprietary computer designed and programmed for a specific task or function. In some embodiments the computer can include software written in JAVA or C programming language. In some embodiments the present invention is implemented through logic embedded in hardware, software, firmware or in some combination of these.

The invention also features a system for rendering an image on a graphic display. In one embodiment, the system includes means for receiving image data from a source can include a sensor and its control software, e.g., MOTE, MTi Inertial Measure Unit, TAU Systems Low Airspeed Sensor. The elements of the critical system that receive, process, and generate the image and partial image data can include any hardware or software that is programmed using a programming language including, for example, C, C++, JAVA, LISP, Assembly, ADA, and TCL. The programming language used, as well as the software, hardware, and firmware implemented in a critical system can be selected based on the failure tolerance threshold of the system and the activity or operation of the operator(s).

Figure 4:
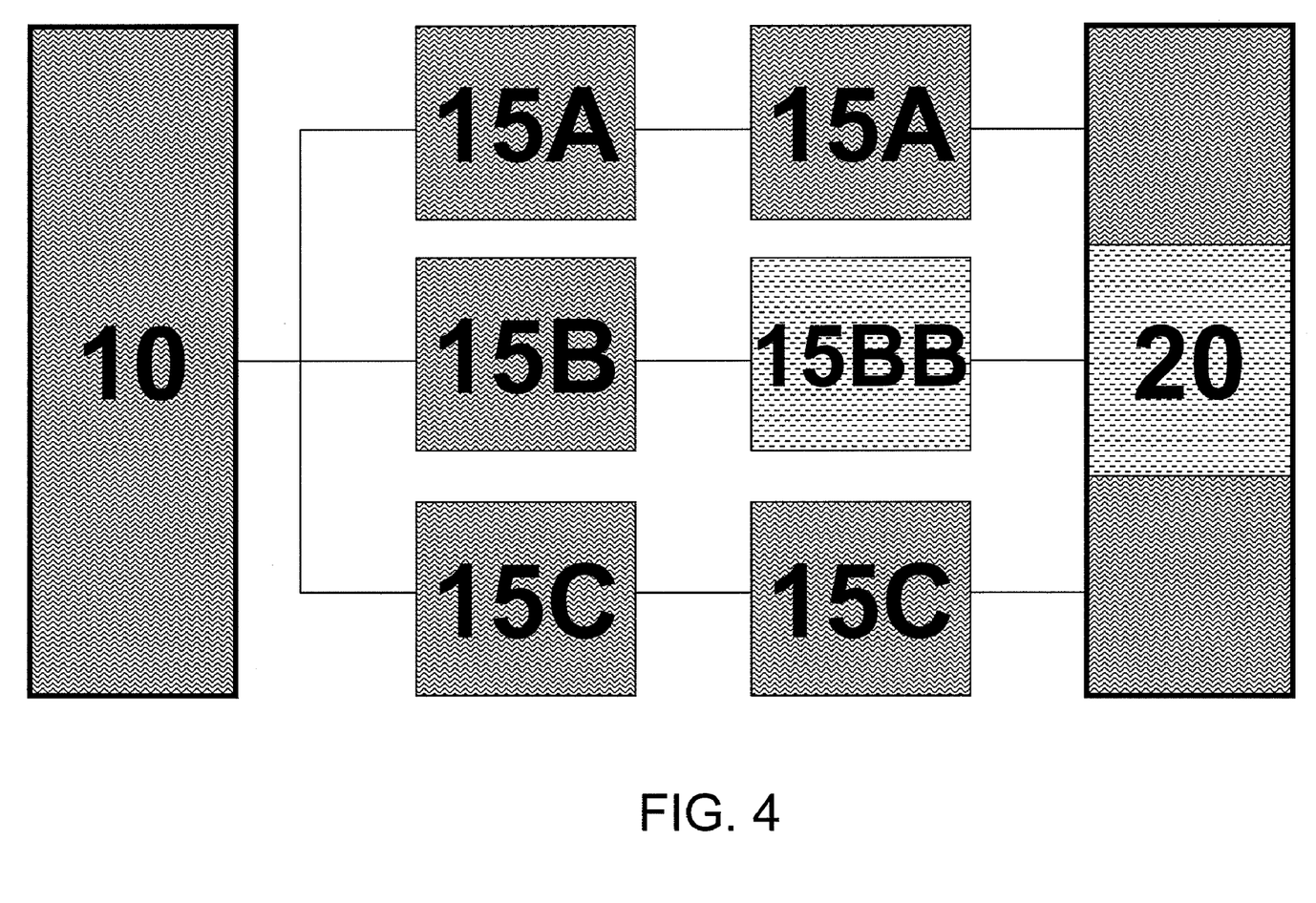
FIG. 4 shows an illustration of a data transmission that utilizes the present invention that would provide an invalid and incorrect graphical image.

In FIG. 4 the present invention is utilized to display an image in a critical system. The message or image data 10 is received from a source. In some embodiments, the image data is received in data packet format; the image data can also be received and stored in the storage module in data packet format. The image data can comprise metadata. As shown, multiple partial images 15A, 15B, 15C can be generated where each partial image is derived from a subset of the received image data. The partial images can be generated at the originating source. The operator may use a system whereby the partial images are generated at the originating source of the image data if the originating source is considered secure. In some embodiments the partial images are not generated until the image data is received by the critical system. Each partial image or command can be transmitted over different channels, and in some embodiments, the multiple commands can be transmitted over a single channel. Furthermore, as discussed above, the total number of commands or partial images that is utilized for any specific system can be determined based on a fault analysis of the system. In some embodiments, the number of commands is optimized in relation to the cost or the software or hardware implemented in the system design. The total number of commands or partial images can also be determined, or optimized, based on the desired transmission speed or rendering time of the final image or the system.

By utilizing the present invention, the reliability of the components of the critical system can be optimized for price or other considerations while maintaining the minimum fault tolerance threshold. The minimum fault tolerance threshold is the reliability value that must be observed for a critical system to ensure that the operator can rely on the images displayed. When the operator is able to rely on the images presented in the system, the graphic display is considered an "authoritative display," as discussed throughout. In some embodiments, a critical system may be designed such that it satisfies a fault tolerance threshold that is greater than the minimum fault tolerance threshold.

An advantage of the presently disclosed critical system design is that the designer can use less reliable parts, while maintaining the minimum fault tolerance threshold. This is because even if the less reliable components cause a failure or corruption of a partial image which results in an incorrect image being transmitted or displayed to the operator, the operator will be able to recognize and evaluate the incorrect image because the incorrect image will also appear to the operator as an invalid image.

In some embodiments, systems that do not have redundant graphics cards and associated drivers can utilize multiple commands to generate graphical authoritative displays. A single graphics card (and associated drivers) can represent a single point of failure when dealing with displaying critical images. Using multiple partial images to generate a final image display requires that the graphics card fail multiple times with the same failure mode to render an incorrect, yet valid image. Increasing the number of commands to produce a valid image will increase the number of simultaneous failures needed to produce an incorrect yet valid image. In some embodiments, the method or system scales up or down depending on the required probability of failure for a system. In some embodiments, for systems that do not have redundant video memory, the criticality support case can include a Fault Tree Analysis (FTA) showing how many video memory bit flips it would take to change a valid image to an incorrect, yet valid, image.

Each partial image requires that the metadata associated with display image properties (e.g., color, shape, location, etc) are broken down and transmitted across independent commands. Subsequently the reassembly of the partial images is required to produce the original image on the display. Breaking the image down into independent commands and then recombining the partial image data to generate the original image is functionally equivalent to an XOR operation in that an error in any one of the commands to the graphics rendering machinery produces an image that is unrecognizable by the user. As the information needed for each graphics rendering command is generated and passed through the critical system, in one embodiment, each message contains an error detection method (e.g. CRC) that allows the software to detect any changes that may have occurred inadvertently or maliciously as the message is passed. In some embodiments, a digital signature can also be passed to guarantee non repudiation. In some embodiments, prior to utilizing the data within a command to generate the image on the display or monitor, the image data is checked once more for any image corrupting changes to the data that may have occurred during the transmission.

In some embodiments the graphical display can include a monitor, the monitor can be built into the critical system or can be a stand-alone monitor such as those used commonly with personal computers. Examples of monitors include TV screens, PDA screens, or ipods screens. Other screens or monitors that can be implemented to display images are also possible. In some embodiments the image is presented using a graphics card, and in some embodiments the image is presented using Organic Light Emitting Diodes (OLED), LCD, or plasma displays. As the image data is be displayed by the critical system in FIG. 4, a failure event occurs which causes, for example a memory flip, that changes the partial image presented in 15BB. Failure events can be caused by data corruption, hardware or software failures, and/or human error. In some embodiments, the failure event is an inadvertent error that results from bit flips, or errors in any software that handles the message or how the image is rendered. A failure event could also be caused if the memory used to store the data to render the image is overwritten or gets full and has to purge some data to fit new data. In some embodiments, the event failure, here an image alteration, could have a malicious cause, for example, malicious data injection, viruses, Trojans, worms, malware, or adware.

By implementing the present invention, when partial images 15A, 15BB, and 15C are combined to form the image 20 that is presented in a graphical display, the operator can evaluate the image and determine that the image is an incorrect image. The operator is able to detect that the image is incorrect because the variations in the shading of image 20 indicates to the operator that the image has been corrupted and is an invalid image. In some embodiments, the properties used to determine a valid image are associated with metadata that is transmitted with the image data. Partial images that are combined to form the graphical image can share a first portion of the metadata that is common to all the partial images.

Figure 5:
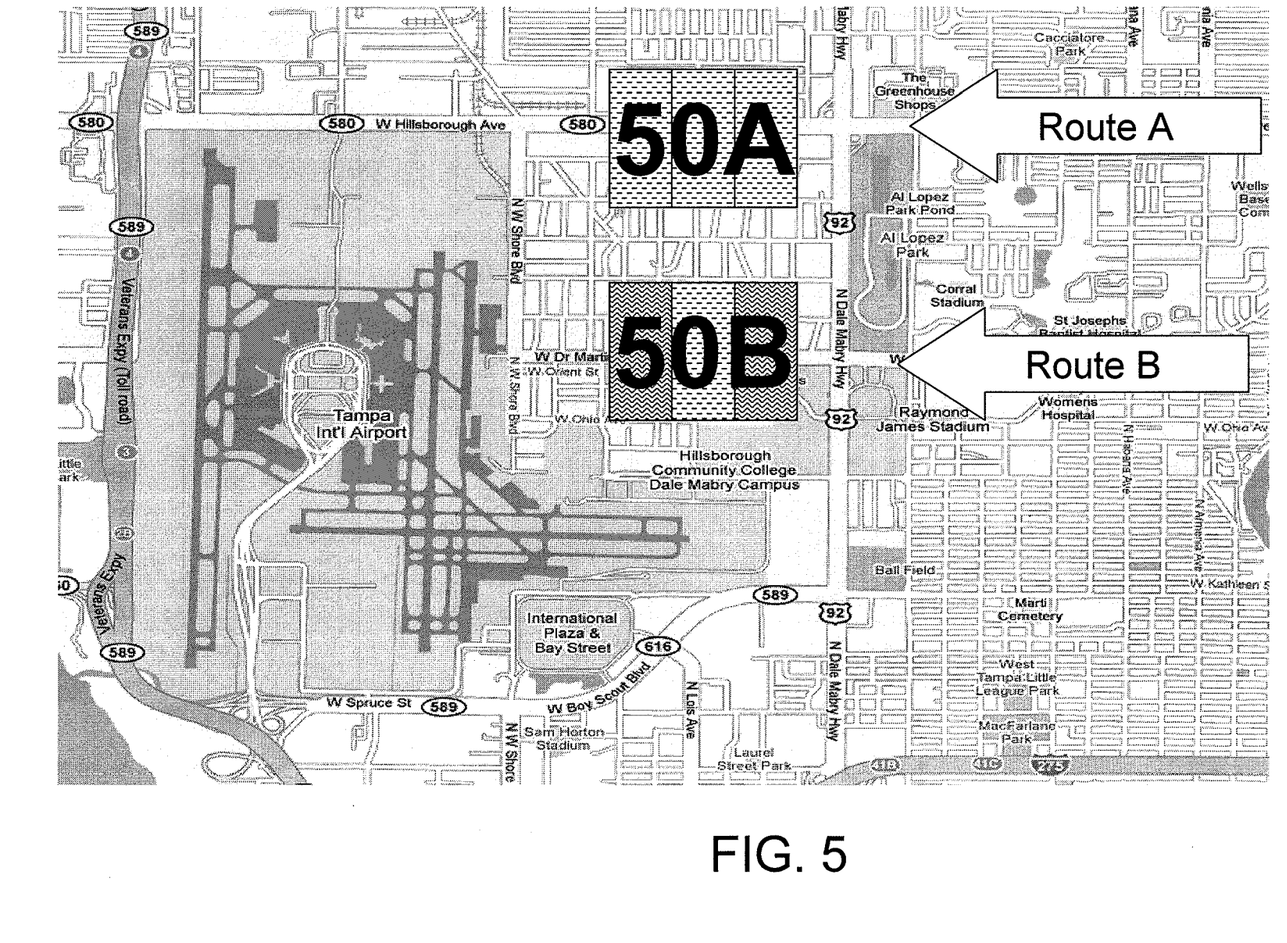
FIG. 5 shows an example of the present invention in an applied application.

In FIG. 5, the metadata associated with the shading of the image is consistent and shared by all the partial images, 15A, 15B, 15C. Therefore, here a data flip associated with the shading metadata caused partial image 15B to change to partial image 15BB. In some embodiments, the common metadata shared by all partial images can be associated with a color, shape, location or any other property associated with the graphical display. The metadata that indicates the validity of the image can also be predetermined or selected based on a pattern or final effect. For example, each partial image can consist of a single, predetermined color such that when all of the partial images are combined the image presented to the operator is black and white because of the multiple overlay of color, and any indication of color would signify an invalid image to the operator.

FIG. 5 shows a possible embodiment of the present invention. Two different routes, Route A and Route B, are considered. Here, an operator relies on the graphical display to tell which of the two routes should be used. For example, the operator could be considering a tactical or military decision to approach or retreat from a geographic location based on intelligence or other information available. Alternatively, the embodiment shown in FIG. 5 could be used by first responders responding to an emergency situation; or an operator viewing a traffic or access reference display.

The operator has received a message, or image data. Multiple partial images for the two different routes were generated from the received image data, and the images 50A, 50B were presented in the graphical display. Simply by examining the graphical display, the operator is able to trust image 50A as a correct, valid image as compared to image 50B which would not be trusted because it is an incorrect, invalid image. The operator is able to trust image 50A because the same fault event would have to occur across all three partial images when the images were displayed to result in image 50A being displayed to the operator as a valid image. In some embodiments, the likelihood that the same fault event would occur simultaneously across all the command stream to cause an incorrect image to appear as a correct, valid image can be designed as a non-zero possibility. In contrast, image 50B is an incorrect, invalid image. The inconsistencies through image 50B allows the operator to visually inspect and evaluate the graphical display. The metadata associated with the shading of the image is common across all partial images. Therefore, by recognizing that there is an inconsistency with the shading across 5B, the operator is able to determine that the image 5B is invalid.

Figure 6:
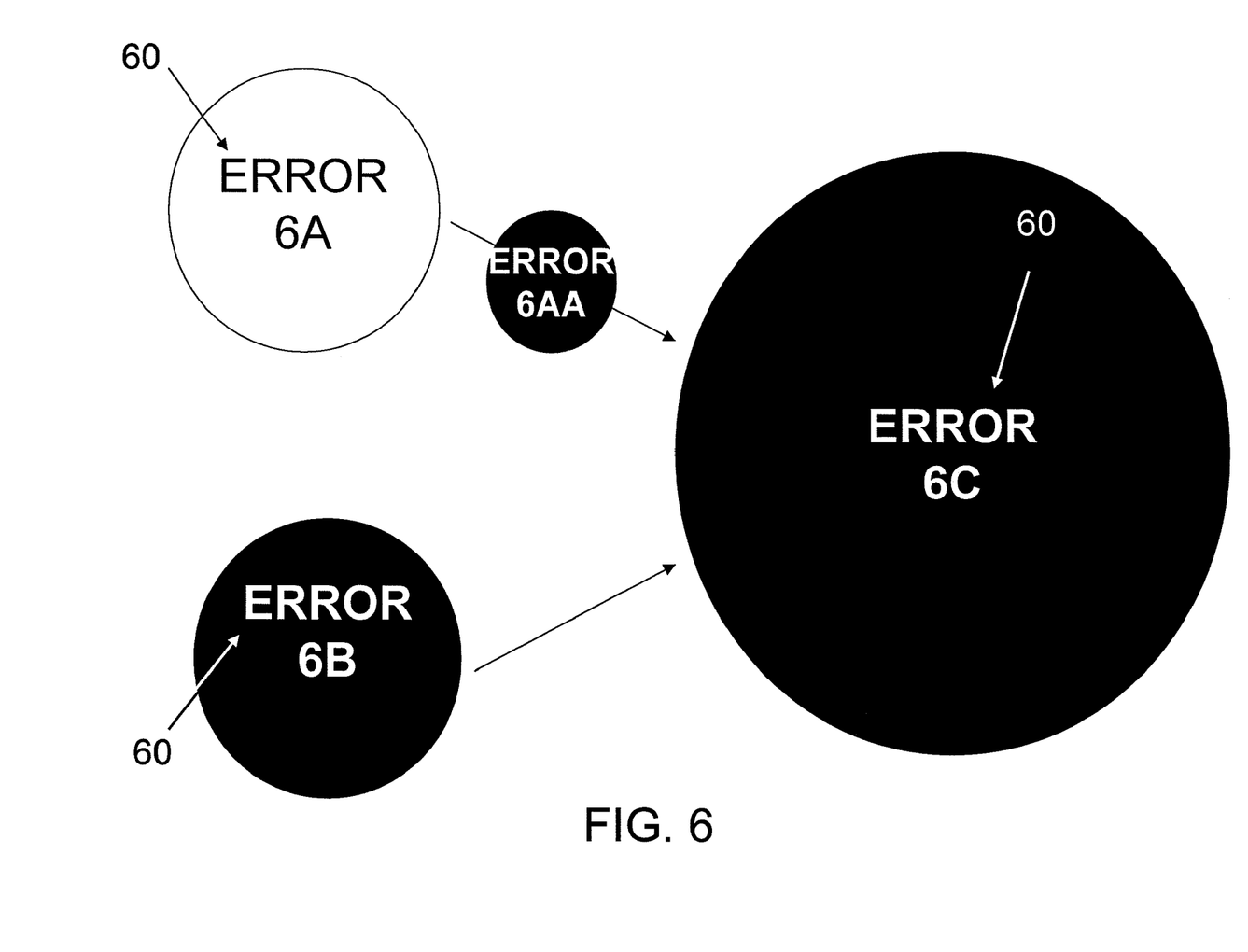
FIG. 6 shows an example of a displayed image with an indicator that illustrates an invalid and incorrect image.

FIG. 6 is another embodiment of the invention that provides multiple partial images that are combined to form a single image. As shown, the partial images are generated to include an indicator 60. The indicator 60 is an "error" message that is added to the partial image. In some embodiments the indicators are associated with indicator metadata that is associated with the subset of image data used to generate the partial image. Indicators can also be color or shape dependent in some embodiments. For example, the lack of an indicator can specify a valid image, or alternatively the presence of the indicator can specify a valid image. An indicator being a specific color, or shape when presented as part of the displayed image can also specify a valid image. In some embodiments, the indicator can be a fixed value for some systems, and in some embodiments the indicator can have predetermined variations or changes which are known to the operator.

Partial image 6A is corrupt in some way (e.g., the information stream is interrupted or corrupted). The image corruption could be caused by the rendering software skipping the rendering of this image due to a memory print error and therefore renders 6B twice. In some embodiments, the image corruption could be caused by the memory where the data to store this image was being stored was overwritten by another image piece. These causes of data corruption are not unique to the critical system illustrated in the figure, but could affect any critical system. The corruption to the metadata is illustrated by the image 6AA turning from white to black and the error indicator changing from black to white. Subsequently, in this embodiment, when the partial images 6AA, 6B are recombined to form the image 6C and presented in the graphical display the operator is able to evaluate the presented image 6C as an invalid image because the error indicator is also presented with the image 6C. In some embodiments, the operator is not able to determine the nature of fault event that occurred and is only able to determine that the final presented image 6C is invalid. However, in some embodiments, the system can perform and prepare an analysis that compares the image data, or metadata, of the final presented image 6C with a copy of the original image data that was received from the source. A copy of the original image data can be stored in a storage module that is part of the system and can be utilized as part of the analysis. Alternatively, a copy of the original image data can be stored remotely, and then accessed through the communication network that connects the critical system with the image data source.

Figure 7:
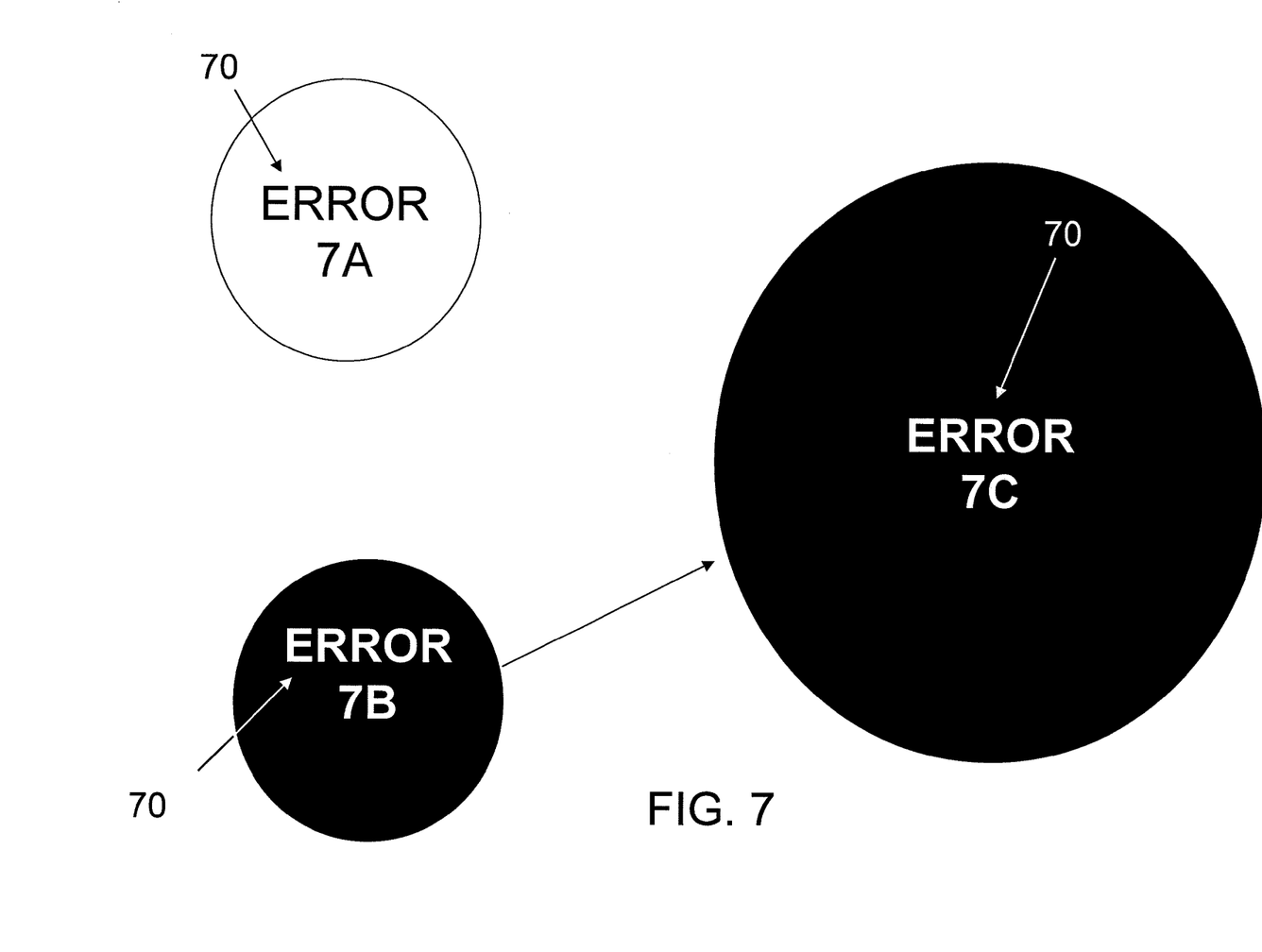
FIG. 7 shows an example of a displayed image with an indicator that illustrates an invalid and incorrect image.

FIG. 7 shows another embodiment where the present invention allows an operator to evaluate the validity of a graphical image based on the presence of an indicator 70. Partial images 7A and 7B are generated from a subset of the original image data. However, when partial images 7A and 7B are combined to form image 7C, the subset of image data associated with partial image 7A is not rendered. The operator is able to evaluate image 7C and determine that the image in an invalid, incorrect image because of the presence of the error indicator 70. In some embodiments a malicious interception, interruption or blockage of the command may have prevented the subset of data associated with partial image 7A from combining with the subset of data associate with partial image 7B. A hardware or software failure such as the rendering software skipping the rendering of image 7A due to a memory print error, instead rendering 7B twice could be the cause of the invalid image 7C. In some embodiments, the image corruption could be caused by the data storage memory related to image 7A being overwritten by another image piece, resulting in the error indicator 70 in the image 7C.

The image 7C presented to the operator is similar to the image 6C in FIG. 6. However, the fault events that caused the error indicator to appear in the two images was different. In FIG. 6 the data associated with image 6A was corrupted, and in FIG. 7 the data associated with partial image 7A was never rendered. Despite the differences in the causes of invalid images 6C, 7C; in both cases an operator can recognize through a visual observation that image 6C, 7C are invalid, and untrustworthy.

Figure 8:
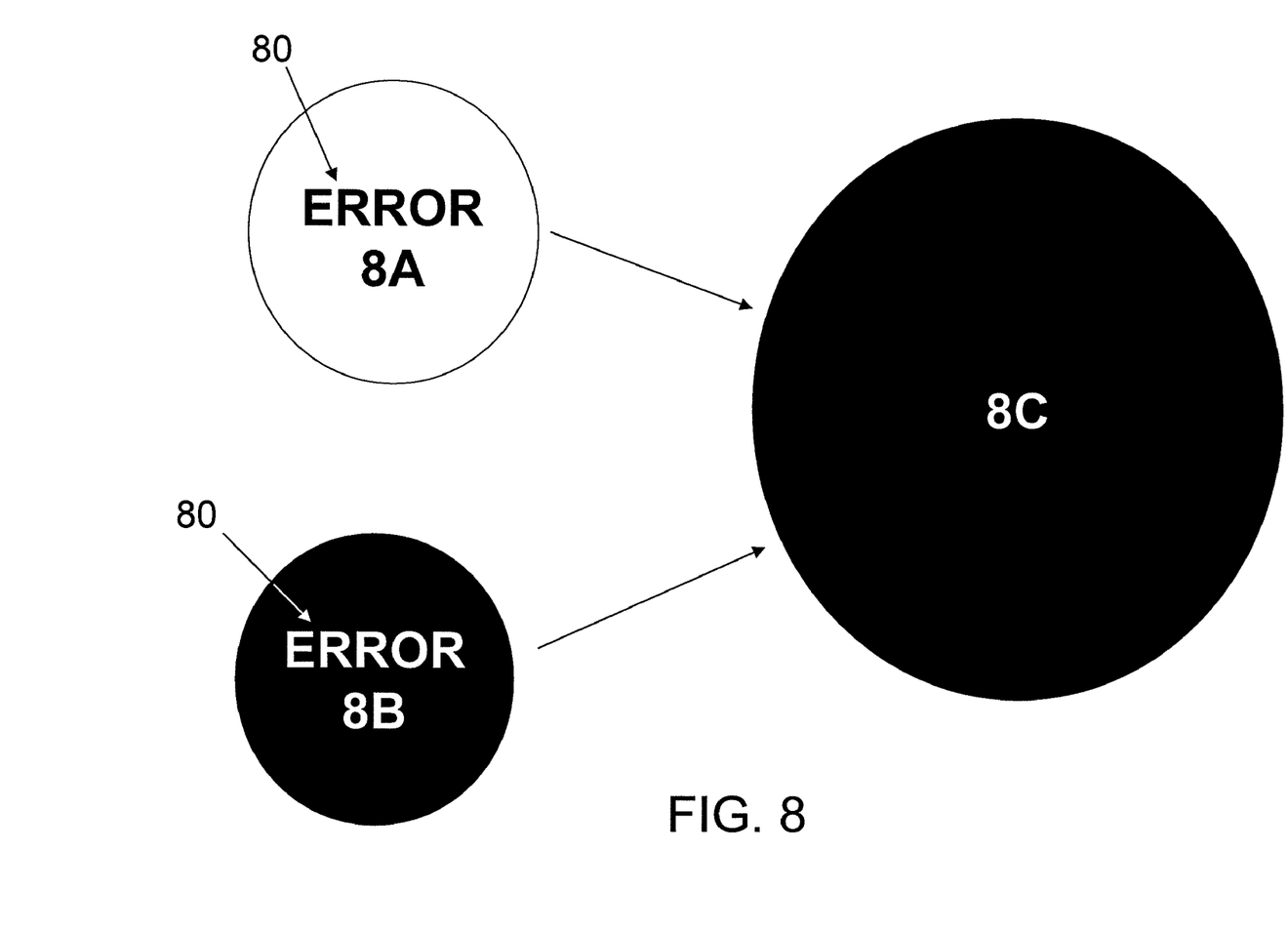
FIG. 8 shows an illustration of a displayed image without an indicator that illustrates a valid and correct image.

FIG. 8 is an embodiment where the image data is received in the system from a source, partial images 8A, 8B are generated from a subset of the image data and an error indicator 80 is added to the metadata of each partial image. The partial images are then transmitted through the system and recombined to form image 8C. Since no fault event occurs and images 8A and 8B combine as intended to form image 8C, there is no error indicator 80 shown in image 8C, i.e., the black error indicator 80 in partial image 8A and the white error indicator 80 in partial image 8B cancel out the other. The lack of an error indicator signifies to the operator evaluating the image that image 8C is valid.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described critical system can be implemented in a distributed computing system that includes a back-end component. The back-end component can, for example, be a data server, a middleware component, and/or an application server. The above described critical system can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system in the critical system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier Internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system in the critical system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco System, Inc. and/or a Cisco® Unified Wireless Phone 7920 available from Cisco System, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

We claim:

1. A method of rendering an image on a single graphic display, the single graphic display being part of a computing device which is in communication with a data source, the method comprising:
   receiving image data at the computing device from the data source;
   storing the image data in a storage module;
   generating, by a processor in the computing device, a plurality of partial images, each partial image derived from a subset of the image data and each partial image having a fault tolerance threshold that is less than the fault tolerance threshold for the image;
   combining the plurality of partial images using the processor to form the image; and
   presenting a viewable image via the single graphical display.

2. The method of claim 1 further comprising passing a digital signature with the image data and the plurality of partial images from the data source to computing device to allow for authentication of a sender.

3. The method of claim 1 wherein the data source is a secure data source.

4. The method of claim 1 further comprising receiving the image data from the data source in communication with the single graphic display via a network.

5. The method of claim 4 further comprising copying the image data received from the data source, generating an original image from the copied image data received from the data source, and comparing the original image with the image generated by combining the plurality of partial images.

6. The method of claim 1 further comprising associating metadata with each partial image in the computing device.

7. The method of claim 6 further comprising combining, in the processor, the metadata associated with the partial images to form the image.

8. The method of claim 1 wherein the image data is encrypted.

9. The method of claim 8 further comprising decrypting the image data.

10. The method of claim 1 further comprising presenting the image in the single graphical display such that an operator can determine the validity of the image.

11. The method of claim 1 further comprising receiving image data from the data sensor and authenticating the data sensor at the computing device.

12. The method of claim 1 further comprising transmitting the subset of the image data over a data stream within the computing device.

13. A system for rendering an image on a graphic display, the system comprising:
   means for receiving image data from a source;
   means for generating a partial image from a subset of the image data, each partial image having a fault tolerance threshold that is less than the fault tolerance threshold for the image;
   means for combining multiple partial images to form the image; and
   means for presenting the image in a single graphical display that can be evaluated by an operator.

14. The system of claim 13 wherein the fault tolerance threshold for the image is selected based on the number of faults that would produce an incorrect and valid image.

15. The system of claim 13 further comprising means for comparing the image generated by the more than one partial image with an original image generated from the image data.

16. The system of claim 13 wherein the system further comprises means for storing the data in a storage module.

17. The system of claim 13 further comprising means for decrypting image data that is encrypted.

18. The system of claim 13 wherein the partial image comprises metadata associated with the partial image.

19. The system of claim 18 wherein the metadata comprises properties of the partial image including color, shape, or location.

20. The system of claim 18 wherein a first portion of the metadata is common to all the partial images.

21. The system of claim 20 wherein a combination of the first portion of the metadata from multiple partial images determines the validity of the image.

22. The system of claim 18 wherein a second portion of the metadata is unique to each partial image.

23. A method of rendering a graphic display, the method comprising:
   receiving image data from a source;
   storing the image data in a storage module;
   generating multiple partial images that include an indicator, the partial images derived from a subset of the image data and each partial image having a fault tolerance threshold that is less than the fault tolerance threshold for the image;
   combining the multiple partial image to form an image; and
   presenting the image in a single graphical display that can be evaluated by an operator.

24. The method of claim 23 further comprising determining the validity of the image based on an evaluation of the indicator.

25. The method of claim 23 wherein the fault tolerance threshold of the image is selected based on the number of faults that would produce an incorrect and valid image.

* * * * *